(12) United States Patent
Campbell et al.

(10) Patent No.: US 7,287,637 B2
(45) Date of Patent: Oct. 30, 2007

(54) CONVEYOR SYSTEM FOR MINIMIZING PRODUCT DAMAGE DURING COLLECTION

(76) Inventors: Kyle Campbell, 1244 N. Selfridge, Clawson, MI (US) 48017; Thomas J. Campbell, 123 E. Bloomfield, Royal Oak, MI (US) 48073; Jeffrey Campbell, 1403 Genesee, Royal Oak, MI (US) 48073; Kevin Campbell, 123 E. Bloomfield, Royal Oak, MI (US) 48073

( * ) Notice: Subject to any disclaimer, the term of this patent is extended or adjusted under 35 U.S.C. 154(b) by 149 days.

(21) Appl. No.: 11/023,185

(22) Filed: Dec. 27, 2004

(65) Prior Publication Data

US 2006/0151295 A1  Jul. 13, 2006

(51) Int. Cl.
*B65G 65/34* (2006.01)

(52) U.S. Cl. .................. 198/550.2; 198/444; 198/572; 198/560

(58) Field of Classification Search ............... 198/444, 198/572, 550.2, 560
See application file for complete search history.

(56) References Cited

U.S. PATENT DOCUMENTS

| | | | |
|---|---|---|---|
| 3,223,964 A * | 12/1965 | Stadlin ..................... 367/96 |
| 3,667,190 A * | 6/1972 | Thornton-Trump .......... 53/503 |
| 4,037,712 A * | 7/1977 | Wochnowski ............... 198/524 |
| 4,140,213 A * | 2/1979 | Denison ..................... 198/358 |
| 4,143,752 A * | 3/1979 | Del Rosso ................ 198/890.1 |
| 4,220,238 A * | 9/1980 | Shavit ....................... 198/400 |
| 4,304,289 A * | 12/1981 | McMullen ................ 164/155.6 |
| 4,437,497 A * | 3/1984 | Enander ......................... 141/1 |
| 4,550,768 A * | 11/1985 | McMullen et al. .......... 164/456 |
| 4,697,689 A * | 10/1987 | Carrell ........................ 198/394 |
| 4,809,842 A * | 3/1989 | Aquino et al. ............ 198/369.2 |
| 4,856,640 A * | 8/1989 | Beswick et al. ............. 198/311 |
| 4,938,336 A * | 7/1990 | Aquino et al. ............ 198/369.2 |
| 5,048,693 A * | 9/1991 | Zaltzman ..................... 209/137 |
| 5,339,943 A * | 8/1994 | Baird et al. .................. 198/358 |
| 5,404,993 A * | 4/1995 | Scarrow .................... 198/550.2 |
| 5,575,583 A * | 11/1996 | Grembowicz et al. ........ 404/72 |
| 5,626,000 A * | 5/1997 | Edwards et al. .............. 53/281 |
| 5,740,901 A * | 4/1998 | Lazzarotti et al. ........... 198/444 |
| 5,820,814 A * | 10/1998 | Doumet ........................ 266/44 |
| 5,987,994 A * | 11/1999 | Maltby et al. ................. 73/646 |
| 6,039,169 A * | 3/2000 | Zaniboni ................... 198/347.1 |
| 6,056,109 A * | 5/2000 | Hidai et al. .................. 198/431 |

(Continued)

FOREIGN PATENT DOCUMENTS

DE     3503239 A1    8/1986

(Continued)

*Primary Examiner*—Joe Dillon, Jr.
(74) *Attorney, Agent, or Firm*—Gifford, Krass, Sprinkle, Anderson & Citkowski, P.C.

(57) ABSTRACT

A conveyor system is provided to limit the vertical fall experienced by a product transported along the conveyor and falling into a collection bin. A sensor in a fixed position relative to the product conveying plane of the conveyor measures product collection height in a collection bin to produce an output signal. A controller dynamically varies the angle between the conveyance plane and the collection bin base plane and the vertical displacement therebetween within a preselected range in order to minimize product damage associated with different fall trajectories from the conveyor into the bin for product. Either the conveyor or the collection bin is pivoted under the command of the controller to accomplish the desired function.

17 Claims, 3 Drawing Sheets

U.S. PATENT DOCUMENTS

| | | | |
|---|---|---|---|
| 6,235,998 B1* | 5/2001 | Brewer | 177/103 |
| 6,269,938 B1* | 8/2001 | Lutz | 198/560 |
| 6,490,227 B2* | 12/2002 | Nagai et al. | 367/99 |
| 6,690,995 B2* | 2/2004 | Prutu | 700/228 |
| 6,832,681 B2* | 12/2004 | VanBerlo | 198/536 |
| 6,952,628 B2* | 10/2005 | Prutu | 700/228 |
| 2002/0014116 A1* | 2/2002 | Campbell et al. | 73/149 |
| 2002/0092728 A1* | 7/2002 | Tanaka | 198/301 |
| 2003/0233816 A1* | 12/2003 | Klapp et al. | 53/542 |

FOREIGN PATENT DOCUMENTS

| | | |
|---|---|---|
| DE | 4235359 C1 | 10/1993 |
| DE | 19849180 A1 | 4/2000 |
| JP | 01044820 A | 2/1989 |
| JP | 03111229 A | 5/1991 |
| JP | 07103844 A | 4/1995 |
| JP | 08110329 A | 4/1996 |
| JP | 09132203 A | 5/1997 |
| JP | 2001171911 | 6/2001 |
| JP | 2003306943 A | 10/2003 |

* cited by examiner

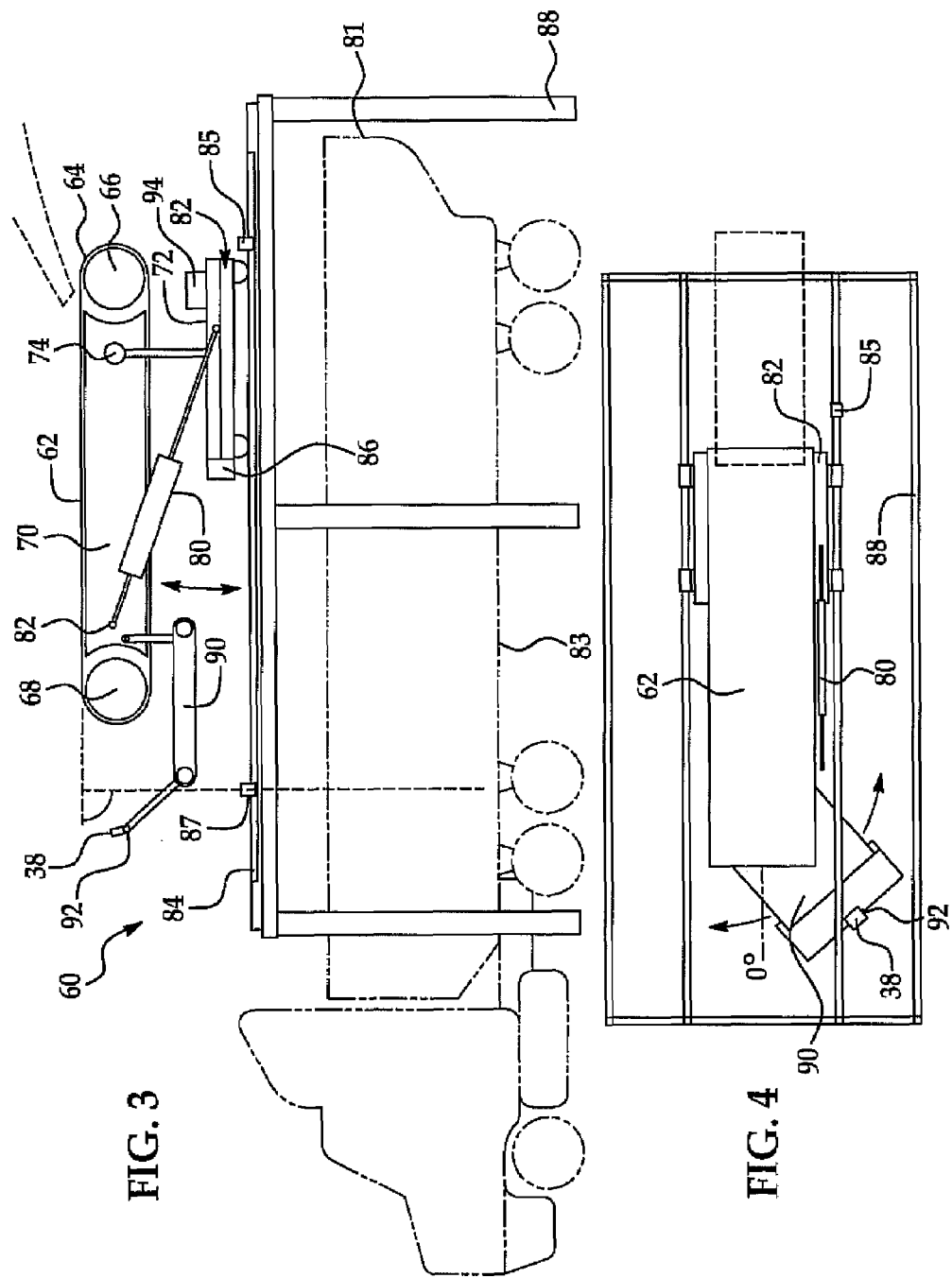

CONVEYOR SYSTEM FOR MINIMIZING PRODUCT DAMAGE DURING COLLECTION

FIELD OF THE INVENTION

The present invention relates in general to a conveyor system and in particular to a conveyor system having a sensor, the readings of which are used to moderate the fall of a product from the conveyor to a collection bin or secondary conveyor.

BACKGROUND OF THE INVENTION

A common source of product damage is found in products being conveyed falling off a conveyor belt and falling into a collection bin. The first products conveyed into a bin experience the longest trajectory and impact with bin surfaces. This product, and subsequently conveyed products, then experience repeated subsequent impacts as other products continue to fill the bin. Additionally, as products are collected in a bin, the products tend to mound about the average trajectory of a product from the conveyor into the bin. This mounding affords inefficient and unbalanced fill of the bin that results in still further product damage associated with the collapse of the unstable mound, agitation to redistribute product within the bin, or mechanical raking. Products such as agricultural produce and various manufactured goods having coatings susceptible to chipping or abrasion, such as painted mechanical fasteners, are representative of the goods that suffer damage upon collection. The prevention of binning damage associated with product collection would have the effect of reducing the amount of operator control with such a conveyor system and reduce product defects.

Thus, there exists a need for a conveyor system capable of moderating the impact experienced by a product falling from a conveyor into a collection bin.

SUMMARY OF THE INVENTION

A conveyor system includes a conveyor having a first end and a second end as well as a conveyance surface. The conveyor ends and the conveyance surface together define a conveyance plane on which a product is transported. A product transported on the conveyor falls from an end into a collection bin. The collection bin has a base and typically, product retaining sidewalls. The collection bin base defines a collection plane that is vertically displaced below the conveyance plane. A collection angle measured from the first end of the conveyor through the vertical displacement is also defined. A pivot mechanism is provided for varying the collection angle and the vertical displacement between the conveyor end and the base of the collection bin. A sensor monitors product collection height and produces an output signal corresponding to the product collection height. A controller activates the pivot mechanism to vary the angle in vertical displacement in response to the sensor output signal reaching a preselected threshold. As a result, product damage associated with different fall trajectories from a conveyor into a collection bin are lessened.

An alternate conveyor system includes a conveyor having a first end fixed about a pivot and a second end, and having a conveyance surface together with the ends defining a conveyance plane for the transport of a product in contact with the conveyance plane beyond the second end. A collection bin having a base for receiving the product is provided, the base of which defining a collection plane vertically displaced below the conveyance plane, and a collection angle measured from the first fixed end through the vertical displacement. A pivot mechanism declines the second end to decrease the collection angle relative to the pivot; a sensor monitoring product collection height on the base, the sensor generating an output signal corresponding to the product collection height. A controller activates the pivot mechanism to vary the collection angle in response to the sensor output signal reaching a preselected threshold.

A process for limiting the drop of a product from a conveyor includes transporting the product along a conveyor. By sensing the vertical displacement between a collection bin surface receiving product coming from the conveyor and/or the height of product collecting in such a bin, one is able to pivot either the conveyor or the bin through an angular range to maintain the vertical displacement within a preselected range. By control of the angular range and the vertical displacement, product damage associated with different trajectories between a conveyor and a collection bin are lessened.

BRIEF DESCRIPTION OF THE DRAWINGS

FIG. 3 is a perspective view of an inventive embodiment of an inventive conveyor system in which a conveyor portion position is variable in the course of product conveyance; and FIG. 4 is a top view of the inventive embodiment depicted in FIG. 3.

DETAILED DESCRIPTION OF THE PREFERRED EMBODIMENTS

The present invention has utility as a conveyance system that limits the height from which a product drops upon leaving a conveyor and enters a collection bin. In limiting fall of a product from a conveyor into a collection bin, product momentum is reduced thereby limiting product rejection. Greater precision in moderating product fall is obtained by sensing the vertical displacement between the conveyor and the base of an unfilled collection bin or a product mound developing within the collection bin.

Figure 1:
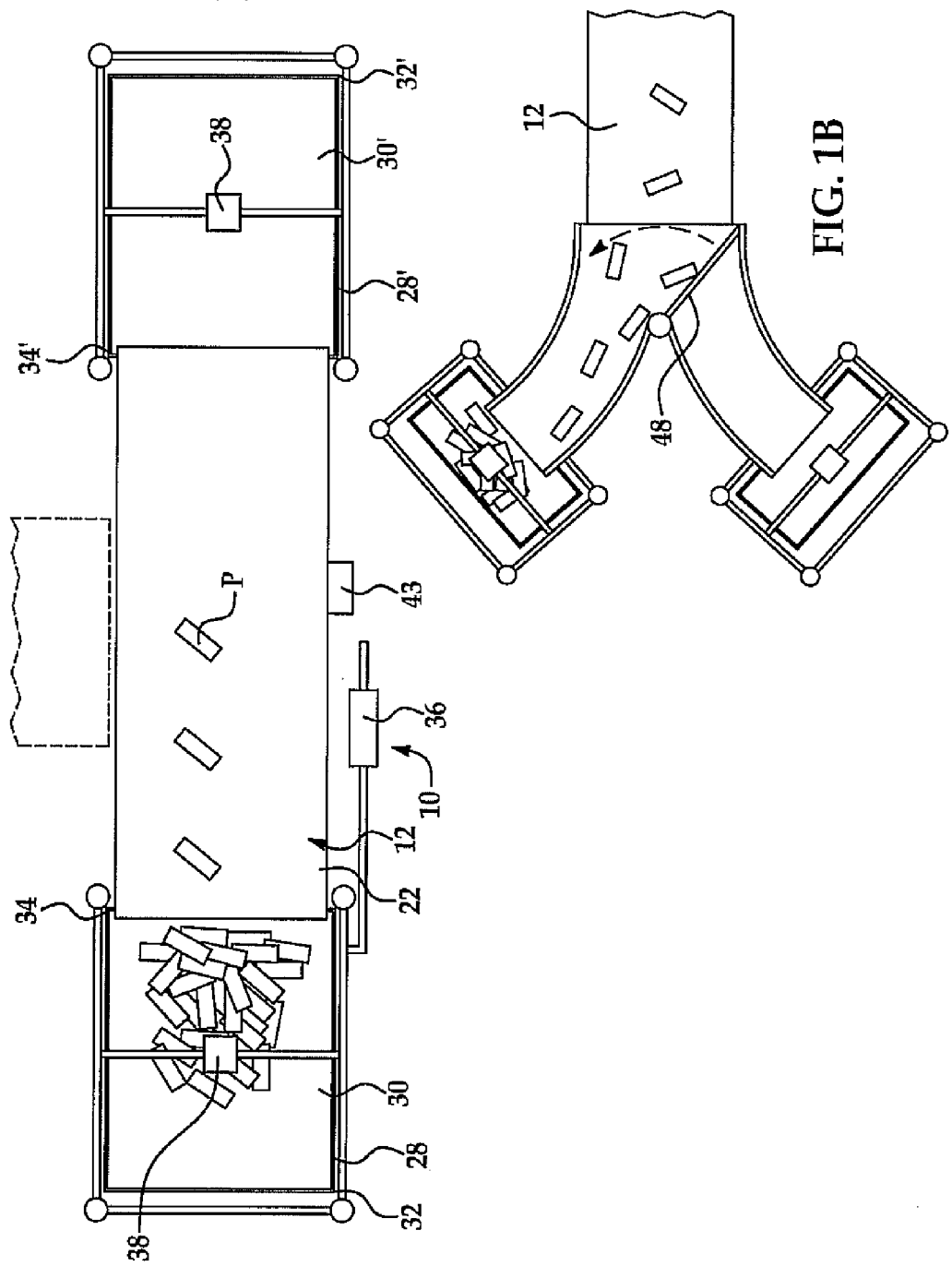
FIG. 1(A) is a top schematic view of an inventive conveyance embodiment in which a collection bin pivots, and (B) a top schematic view of another inventive embodiment having a chute intermediate between the bin and conveyor.
Figure 2:
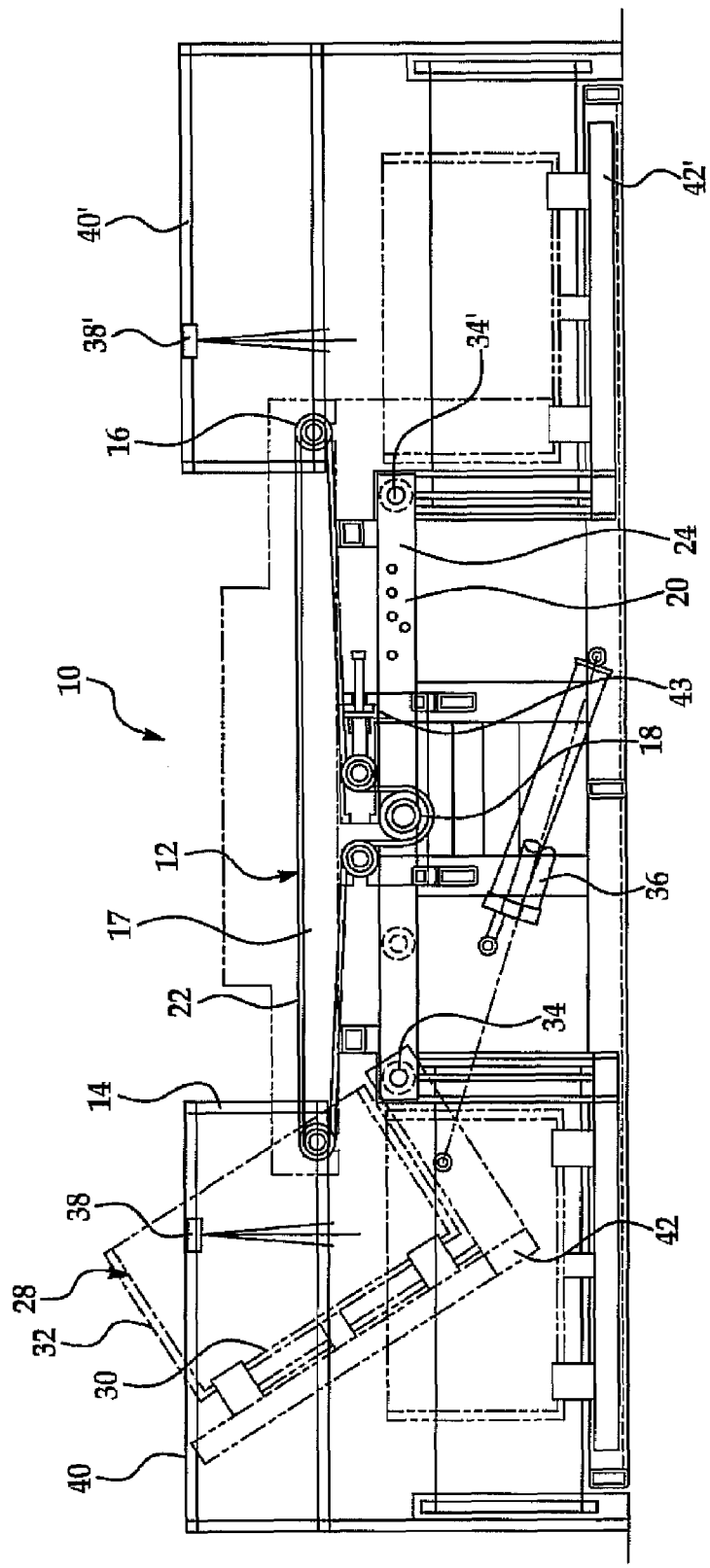
FIG. 2 is a side view in partial cutaway of the inventive embodiment depicted in FIG. 1(A)

Referring now to FIGS. 1(A) and 2, an inventive conveyor system is shown generally at 10. The conveyor system 10 has a conveyor 12 extended between two guide rollers 14 and 16. A motor (not shown) is mechanically coupled to the drive wheel 18 and serves to rotate the drive wheel thereby reducing movement of the conveyor 12 between guide rollers 14 and 16. The conveyor 12 has an upper surface 22 that defines a conveyance plane. A product P being transported by the conveyor 12 is in contact with the conveyance plane until reaching the end of the conveyor 12 corresponding to the tangential surface thereto of one of the guide rollers 14 or 16, platen 17 optionally spans the distance therebetween. While the conveyor 12 is depicted in the figures as a belt conveyor, it is appreciated that other conventional conveyor types are also operative herein illustratively including chain, and roller. The guide rollers 14 and 16, drive wheel 18, motor, and tensioning rollers are all secured to a stationary frame 24.

Product P is loaded onto the conveyor 12 from a variety of sources illustratively including manual loading, a feed conveyor, and an auger.

A product P placed upon the upper surface 22, regardless of the feed source for the conveyor 12, is transported along the conveyance surface 22 in a direction commensurate with the rotational direction of the drive wheel 18. Upon a product P reaching the end of the conveyor 12, the product falls from the conveyor 12 into a collection bin 28. The collection bin 28 has a base 30 and at least one sidewall 32, the base 30 defining a collection plane. A collection angle α is measured as the shortest linear length connecting the conveyance plane and the collection plane. In prior art systems, the conveyance plane and collection plane are fixed, typically defining an angle α of 90 degrees. In the present invention, a pivot 34 is provided to vary the angle α so as to maintain the fall distance a product P endures in moving from the conveyor 12 into the bin 28 within a preselected range. As depicted in FIG. 1, it is appreciated that a collection bin 28 that is empty or nearly empty is pivoted to an angle α such that α product P falling into the bin 28 initially contacts a bin sidewall 32 to thereafter fall into a corner between the base 30 and sidewall 32 or into contact with the base 30. The pivot 34 in conjunction with an actuator forms a pivot mechanism. An actuator operative in the present invention illustratively includes a worm gear, and a hydraulic piston. Preferably, the actuator is a hydraulic piston 36. A sensor 38 monitoring the vertical displacement between a fixed point relative to the conveyance surface and a vertically displaced portion of the collection bin 28 is measured by a sensor 38. Preferably, the sensor 38 is horizontally displaced relative to the guide roller 14 by an amount approximating the arc of fall for a product P based on the linear speed of the conveyor 12. More preferably, the sensor 38 is secured to a mount 40 positioned above the conveyance plane in order to lessen debris and contaminant accumulation associated with either the product P or the conveyor 12. In those instances where the conveyor 12 operates at a variety of speeds thereby producing varying product fall trajectories, the sensor 38 moves laterally along the mount 40 with a stepper motor interfaced to the revolutions per minute or power requirements of the conveyor drive motor.

The sensor 38 operative herein illustratively includes ultrasonic, optical, and magnetic. The choice of sensor being dictated by the factors illustratively including the nature of the product P, signal interference associated with the conveyor components or the collection bin. Preferably, the sensor 38 is an ultrasonic sensor. The sensor 38 regardless of the mechanism of product collection height within the bin generates an output signal corresponding to the height of product P within the bin 28. A controller 43 receives the output signal from the sensor 38 and activates the pivot mechanism through the hydraulic piston 36 in order to vary the angle α in response to the sensor output signal reaching a preselected threshold. The preselected threshold typically being a product collection height that is becoming comparatively high and thereby decreasing the product fall height to below a preselected threshold. Alternatively, when the angle α as depicted in FIG. 2 becomes too large, the vertical fall a product P would experience would exceed a preselected threshold. In typical operation, a collection bin 28 begins to receive product P with the angle α being at the minimum extremum and as the collection bin 28 fills, the angle α increases due to a maximum extremum of 90 degrees in the embodiment depicted in FIG. 2. With periodic or continuous sensor output signal being received by the controller and the pivot mechanism being adjusted in response thereto, a feedback mechanism is provided to assure product fall heights are maintained within a preselected range.

In the preferred embodiment depicted in FIGS. 1A and 2, the conveyor 12 is bidirectional with like components being denoted with the same numerals as detailed above with the exception that the numerals are now primed. An inventive conveyor system having multiple collection bins provides the added benefit of allowing one to continue product collection while another collection bin is being exchanged. In a still more preferred embodiment, additional ease of collection bin exchange and safety are provided by providing a cradle 42 sized to receive a collection bin 28 thereon with the cradle 42 moving about the pivot 34 under the action of the hydraulic piston 36. Still more preferably, a safety cage surrounds the collection bin 28 in order to lessen the possibility of inadvertent contact with the collection bin 28 during the course of the change in angle α and vertical displacement.

In operation, an inventive system 10 upon being energized has both cradles 42 and 42' in a position where the angle α is about 90 degrees. An empty collection bin is then loaded into either of cradle 42 or 42". With a collection bin in place, the controller is activated corresponding to that particular conveyor end. The controller then pivots the appropriate cradle loaded with a collection bin into a minimum angle α fill position in preparation to receive product. The conveyor then begins to move in the direction of the empty collection bin and product begins to fill the collection bin. With conveyor movement, the sensor begins providing output signal to the controller as to the fill height of product within the collection bin. Upon a sensor output signal indicating that product mound height has attained a preselected level, the hydraulic piston begins to increase the angle α between the conveyor end and the collection bin through movement of the cradle. Sensor output signal and adjustment in the angle α continues until the filling collection bin reaches a maximal angle α. Typically the maximum angle α is 90 degrees with the minimum fill angle being greater than 10 degrees and often greater than 20 degrees. With a collection bin at the maximal angle α, the process can be repeated with the opposing collection bin being placed onto the opposing cradle. With the first collection bin arriving at a maximum angle α position and the sensor providing output that the collection bin has been filled to a preselected level, the conveyor reverses direction of conveyance and begins to fill the second collection bin without a disruption of product movement. The filled collection bin is then amenable to removal and optionally replacement as a second collection bin fills in a process as detailed above. In the event that a first collection bin attains a maximal angle α and has been filled to a preselected level based on sensor output and a second collection bin is not in a minimum angle α position, ready to receive product, then the controller stops movement of the conveyor. After a preselected amount of time with the conveyor in a stop mode, typically 5 to 500 seconds, a visual and/or auditory alarm indicates to an operator that the inventive system is in a standby mode.

During the operation process a mechanical safety cage is preferably provided. Still more preferably, a light curtain is active in those regions where an operator could potentially sustain an injury. If at any point during the operation process a light curtain beam is broken on the operating side of an inventive system, the controller responds accordingly. In the instance where one collection bin is filling and the second collection bin is not at a minimal angle α position, the conveyor is stopped and the operator is required to clear any obstructions along the light curtain beam path prior to the inventive system allowing restart. In the instance where a collection bin is filled and the opposing bin is in a minimum angle α position and ready to receive product, the conveyor will reverse direction and begin to fill the second collection bin and the operator must assure that any obstructions along the length of a light curtain beam have been removed prior to the controller allowing system restart. Upon restart, an operator designates the conveyor direction and thereby which bin to continue filling. In instances where both collection bins are in a minimum angle α position and a light curtain beam is broken on the side to which no fill is currently occurring, the conveyor will cease operation and an operator must assure that area is likewise free of obstructions prior to restart.

While the present invention is depicted in FIGS. 1A and 2 with respect to a reversible direction conveyor capable of feeding product to collection bins at the opposing ends of the conveyor, it is appreciated that an inventive conveyor system is also provided with a single direction conveyor coupled to a diverter chute system as depicted in FIG. 1B in which a flap valve 48 or other conventional gating system, as opposed to reversing conveyor direction, shunts product to a particular collection bin. While the chute system depicted in FIG. 1B has two collection bins for the sake of clarity, it is appreciated that a larger number of collection bins can be coupled therewith. A chute-based conveyor system according to the present invention having more than two collection bins finds particular utility in instances where a high throughput product is collected in comparatively quickly filled collection bins, as is the case for instance with numerous edible products such as produce. Multiple gate diverter chute systems are well known to the art and operative herewith. U.S. Pat. No. 4,143,752 is indicative of a multiple gate chute system.

Referring now to FIGS. 3 and 4, an alternate inventive conveyor system is depicted generally at 60. The conveyor system 60 finds particular application in the filling of comparatively large collection bins that are not amenable to pivoting in order to dynamically change a collection angle α. As such, the conveyor 60 has a conveyor 62 that pivots about a fixed end 64 to effectively decrease the collection angle α as previously defined by pivoting the conveyance plane of the conveyor 62 relative to a static collection plane as previously defined. The conveyor 62 receives product P from any number of sources including a parallel conveyor, a non-parallel feed conveyor, an auger, and manual placement. Product P is fed to the conveyor 62 in the region proximal to the fixed end 64 as from a hopper shown in ghost. The conveyor 62 has two guide rollers 66 and 68. The support platen 70 is secured to a frame 72 by way of a pivot 74 extending from an arm 76. The frame 72 anchors a first end 78 of an angle modifying actuator 80 depicted herein as a hydraulic piston. The actuator 80 has a second end 82 pivotally attached to the support platen 70 remote from the pivot 74 to create a conveyor with a variable collection angle conveyor. The conveyor 62 provides a dynamic collection angle α upon a sensor as detailed herein being affixed proximal to the free conveyor guide roller 68. However, there is often a requirement that not only is the collection angle α dynamic but also control is maintained of product trajectory into a collection bin. While a collection bin 80 can be translated in the linear direction of conveyor product movement, preferably the frame 72 has a wheeled undercarriage 82 traversing a rail 84 under the control of an actuator driven motor 86. The rail 84 resting on supports 88 bounding the collection bin 81. The travel of the wheeled carriage 82 on the rail 84 is limited by conventional means illustratively including the coupling of a mechanical brake to the rail 84 at the travel limits for the wheeled carriage 82 or alternatively through the use of a conventional proximity sensor. Travel limits on the wheeled carriage 82 are provided to avoid collision between a declined conveyor 62 and an inexactly positioned collection bin 81.

In situations where the collection bin 81 has a width considerably greater than that of the conveyor 62, a transverse spreader 90 is preferably attached to the conveyor 62 proximal to the free guide roller 68 through attachment to the support platen 70. A spreader 90 is typically indicated where the collection bin 81 has a width of greater than twice the width of the conveyor 62. The spreader 90 as depicted in FIGS. 3 and 4 is a conveyor mounted to the support platen 70 by way of a pivot allowing rotation of the spreader 90 through an angle of up to 180 degrees where the direction of travel for the conveyor 62 defines a 0 degree central point. It is appreciated that a spreader according to the present invention also can take the form of a rotating wheel or a rotatable chute. A sensor 38 having attributes as described above with respect to FIGS. 1A and 2 is mounted proximal to guide roller 68 in instances when an optional spreader 90 is not present. When a spreader 90 is present, sensor 38 is optionally mounted to the spreader 90 or continues to extend from the conveyor 62 from a frame that extends so as to project a beam towards the collection bin 81 in the vicinity of product trajectory. In recognition of the collection angle α changing as a result of conveyance plane modification, the sensor 38 is secured to a mount 40 as detailed above with respect to FIGS. 1 and 2 by way of a pivot pin 92 that is generally parallel to pivot 74 such that the sensor 38 is providing readings of product height as a vertical displacement measurement relative to the sensor 38.

The conveyor system 60 is particularly well suited for the filling of highway vans and rail cars with particulate materials to provide balanced loading and limit airborne particulate during the loading process. In operation, a collection bin 81 is placed between rail supports 88 and the conveyor 62 is declined to the minimal collection angle α relative to the base 83 of the collection bin 81, shown in ghost in FIG. 3. Depending on the width of the collection bin 81 relative to the conveyor 62, the spreader 90 is locked or allowed to traverse. In the event that the collection bin 81 is less than about twice the width of the conveyor 62, the spreader 90 is locked at a 0 angle at a 0 angle position. In instances where the conveyor bin 81 is wider than about twice the conveyor width, the spreader 90 is allowed to rotate relative to the 0 angle position. Preferably, when the spreader 90 is rotating, the conveyor 62 is positioned along the midline relative to the long axis of the collection bin 81. With the conveyor 62 in a minimal collection angle position relative to the collection bin base 83, the conveyor 62 is activated and the sensor 38 begins to provide continuous or periodic output signals to the controller 94 when the product height within the collection bin 81 has reached a predetermined height. Upon product collection reaching a predetermined height, an incremental rotation of the spreader 90 is performed by the controller until a maximal rotation angle for the spreader 90 is obtained, at which point rotation of the spreader 90 in the opposite direction occurs with an incremental traverse of the wheeled carriage 82 occurring under the command of the controller 94. With this process the spreader rotation and wheeled carriage translation along the rails continues until the wheeled carriage reaches the end of the rail travel 85. At the end of the rail travel 85, the controller drives actuator 80 to increase the collection angle α and initiate wheeled carriage travel towards the other rail travel end 87 while the spreader 90 rotates through an angle range determined by the collection bin width. This process is continued until the collection bin 81 is filled and the conveyor 62 is returned to a collection angle α such that the collection bin 81 can be cleared from beneath the inventive conveyor system 60.

Patent documents and publications mentioned in the specification are indicative of the levels of those skilled in the art to which the invention pertains. These documents and publications are incorporated herein by reference to the same extent as if each individual document or publication was specifically and individually incorporated herein by reference.

The foregoing description is illustrative of particular embodiments of the invention, but is not meant to be a limitation upon the practice thereof. The following claims, including all equivalents thereof, are intended to define the scope of the invention.

The invention claimed is:

1. A conveyor system comprising:
    a conveyor having a first end and a second end and a conveyance surface together defining a conveyance plane for the transport of a product in contact with the conveyance plane beyond the first end;
    a collection bin having a base and a sidewall, said bin receiving the product from the second end, the base defining a collection plane having a vertical displacement below said conveyance plane, and a collection angle measured from the first end to a sidewall through the vertical displacement;
    a pivot mechanism for varying the collection angle and the vertical displacement between said conveyance plane and the base of said collection bin;
    a sensor monitoring product collection height and generating an output signal corresponding to product collection height; and
    a controller activating said pivot mechanism to vary the angle and vertical displacement in response to the sensor output signal reaching a preselected threshold.

2. The system of claim 1 wherein said conveyor is bidirectional.

3. The system of claim 2 further comprising a second collection bin vertically displaced below the second end.

4. The system of claim 1 wherein said pivot mechanism is in mechanical communication with said bin.

5. The system of claim 1 further comprising a cradle supporting said bin, said cradle in mechanical communication with said pivot mechanism.

6. The system of claim 1 wherein said pivot mechanism comprises a pivot pin and an actuator coupled to a rotatable portion of said conveyor or said bin.

7. The system of claim 1 wherein said pivot mechanism comprises a hydraulic piston.

8. The system of claim 1 wherein said pivot mechanism simultaneously varies collection angle and vertical displacement.

9. The system of claim 8 wherein said pivot mechanism decreases collection angle during the course of filling said bin.

10. The conveyor system of claim 8 wherein said pivot mechanism increases the collection angle during the course of filling said bin.

11. The system of claim 1 wherein said pivot mechanism varies the collection angle between less than 100 degrees and more than 10 degrees.

12. The system of claim 1 wherein said sensor is ultrasonic.

13. The system of claim 1 further comprising a mount supporting said sensor such that the output signal of said sensor is indicative of product collection height proximal to the vertical displacement.

14. The system of claim 13 further comprising a pivot pin intermediate between said sensor and said mount.

15. The system of claim 13 further comprising a stepper motor interfaced with said controller to adjust sensor position as a function of conveyor speed.

16. The system of claim 1 wherein said controller stops said conveyor from transporting the product to said bin upon said pivot mechanism reaching an extremum of the collection angle and the preselected threshold has been exceeded.

17. The system of claim 1 further comprising a gated chute intermediate between said conveyor and said collection bin in the travel of the product.

\* \* \* \* \*

UNITED STATES PATENT AND TRADEMARK OFFICE
CERTIFICATE OF CORRECTION

| | | |
|---|---|---|
| PATENT NO. | : 7,287,637 B2 | Page 1 of 1 |
| APPLICATION NO. | : 11/023185 | |
| DATED | : October 30, 2007 | |
| INVENTOR(S) | : Thomas J. Campbell et al. | |

It is certified that error appears in the above-identified patent and that said Letters Patent is hereby corrected as shown below:

Column 4, Line 23, replace "cradle 42 or 42" with --cradle 42 or 42'--

Signed and Sealed this

Eighteenth Day of March, 2008

JON W. DUDAS
*Director of the United States Patent and Trademark Office*